US012132205B2

(12) United States Patent
Kim et al.

(10) Patent No.: US 12,132,205 B2
(45) Date of Patent: Oct. 29, 2024

(54) LITHIUM COMPOSITE ANODE, METHOD OF FABRICATING THE SAME, AND LITHIUM SECONDARY BATTERY INCLUDING THE SAME

(71) Applicant: SK INNOVATION CO., LTD., Seoul (KR)

(72) Inventors: Ju Young Kim, Daejeon (KR); Young-Gi Lee, Daejeon (KR); Kwang Man Kim, Daejeon (KR); Dong Ok Shin, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 307 days.

(21) Appl. No.: 16/042,935

(22) Filed: Jul. 23, 2018

(65) Prior Publication Data

US 2019/0074515 A1 Mar. 7, 2019

(30) Foreign Application Priority Data

Sep. 1, 2017 (KR) ........................ 10-2017-0112120
Dec. 12, 2017 (KR) ........................ 10-2017-0170704

(51) Int. Cl.
*H01M 4/58* (2010.01)
*H01M 4/04* (2006.01)
(Continued)

(52) U.S. Cl.
CPC ....... *H01M 4/5825* (2013.01); *H01M 4/0404* (2013.01); *H01M 4/0409* (2013.01);
(Continued)

(58) Field of Classification Search
CPC ............. H01M 4/0416; H01M 4/0409; H01M 4/0404; H01M 4/043
See application file for complete search history.

(56) References Cited

U.S. PATENT DOCUMENTS

| | | | | |
|---|---|---|---|---|
| 2002/0012846 A1* | 1/2002 | Skotheim | H01M 50/46 | |
| | | | 429/231.95 | |
| 2003/0180472 A1* | 9/2003 | Zhou | B05D 1/204 | |
| | | | 427/430.1 | |

(Continued)

FOREIGN PATENT DOCUMENTS

| | | |
|---|---|---|
| EP | 2432051 A1 | 3/2012 |
| KR | 10-1223556 B1 | 1/2013 |

(Continued)

OTHER PUBLICATIONS

Xin-Bing Cheng et al., "Dendrite-Free Lithium Deposition Induced by Uniformly Distributed Lithium Ions for Efficient Lithium Metal Batteries", Advanced Materials, 2016, vol. 28, pp. 2888-2895, Wiley-VCH Verlag Gmbh & Co.

(Continued)

*Primary Examiner* — Brian R Ohara
*Assistant Examiner* — Brent C Thomas
(74) *Attorney, Agent, or Firm* — Perkins Coie LLP

(57) ABSTRACT

Provided is a lithium composite anode including a metal film, and lithium ion conductors and electron conductors dispersed on one surface of the metal film, wherein portions of the lithium ion conductors and electron conductors are impregnated into the metal film from the one surface of the metal film.

12 Claims, 10 Drawing Sheets

(51) Int. Cl.

| | |
|---|---|
| ***H01M 4/131*** | (2010.01) |
| ***H01M 4/134*** | (2010.01) |
| ***H01M 4/136*** | (2010.01) |
| ***H01M 4/137*** | (2010.01) |
| ***H01M 4/1391*** | (2010.01) |
| ***H01M 4/1395*** | (2010.01) |
| ***H01M 4/1397*** | (2010.01) |
| ***H01M 4/62*** | (2006.01) |
| ***H01M 10/0525*** | (2010.01) |
| *H01M 4/02* | (2006.01) |

(52) U.S. Cl.

CPC ......... *H01M 4/0416* (2013.01); *H01M 4/043* (2013.01); *H01M 4/131* (2013.01); *H01M 4/134* (2013.01); *H01M 4/136* (2013.01); *H01M 4/137* (2013.01); *H01M 4/1391* (2013.01); *H01M 4/1395* (2013.01); *H01M 4/1397* (2013.01); *H01M 4/623* (2013.01); *H01M 4/626* (2013.01); *H01M 10/0525* (2013.01); *H01M 2004/027* (2013.01)

(56) References Cited

U.S. PATENT DOCUMENTS

| | | | | |
|---|---|---|---|---|
| 2004/0241532 | A1* | 12/2004 | Kim | B82Y 30/00 429/517 |
| 2011/0171502 | A1* | 7/2011 | Kottenstette | H01M 10/446 429/49 |
| 2011/0171525 | A1* | 7/2011 | Abe | H01M 4/623 429/212 |
| 2011/0281167 | A1* | 11/2011 | Sabi | H01M 4/134 429/231.95 |
| 2012/0164529 | A1* | 6/2012 | Bahr | C25D 1/00 429/211 |
| 2013/0157106 | A1 | 6/2013 | Lee et al. | |
| 2014/0008006 | A1 | 1/2014 | Lee et al. | |
| 2015/0004488 | A1* | 1/2015 | Abdelsalam | H01M 8/00 429/218.1 |
| 2015/0295246 | A1 | 10/2015 | Son et al. | |
| 2016/0104891 | A1* | 4/2016 | Holme | H01M 4/667 429/303 |
| 2016/0365569 | A1 | 12/2016 | Lee et al. | |
| 2019/0181425 | A1* | 6/2019 | Tour | H01M 2/1666 |

FOREIGN PATENT DOCUMENTS

| | | | |
|---|---|---|---|
| KR | 10-1400994 | B1 | 5/2014 |
| KR | 10-2015-0016897 | A | 2/2015 |
| KR | 10-1621410 | B1 | 5/2016 |
| KR | 10-2016-0144831 | A | 12/2016 |

OTHER PUBLICATIONS

Hongkyung Lee et al., "Structural modulation of lithium metal-electrolyte interface with three-dimensional metallic interlayer for high-performance lithium metal batteries", Scientific Reports, 2016, pp. 1-10.

Zheng Liang et al., "Polymer Nanofiber-Guided Uniform Lithium Deposition for Battery Electrodes", Nano Letters, 2015, vol. 15, pp. 2910-2916, American Chemical Society Publications.

Rahul Mukherjee et al., "Defect-induced plating of lithium metal within porous graphene networks", Nature Communications, 2014, pp. 1-10, Macmillan Publishers Limited.

Myung-Hyun Ryou et al., "Mechanical Surface Modification of Lithium Metal: Towards Improved Li Metal Anode Performance by Directed Li Plating", Advanced Functional Materials, 2015, vol. 25, pp. 834-841, WILEY-VCH Verlag Gmbh &Co.

* cited by examiner

LITHIUM COMPOSITE ANODE, METHOD OF FABRICATING THE SAME, AND LITHIUM SECONDARY BATTERY INCLUDING THE SAME

CROSS-REFERENCE TO RELATED APPLICATIONS

This U.S. non-provisional patent application claims the benefit of priority under 35 U.S.C. § 119 to Korean Patent Application Nos. 10-2017-0112120, filed on Sep. 1, 2017, and 10-2017-0170704, filed on Dec. 12, 2017, the entire contents of which are incorporated by reference herein in its entirety.

BACKGROUND

The present disclosure relates to an anode for a secondary battery and a secondary battery including the same, and more particularly, to an anode for a lithium secondary battery and a lithium secondary battery including the same.

A lithium ion secondary battery is currently being used as a core power source of a mobile electronic communication device such as a mobile phone or notebook computer. The lithium ion secondary battery shows a higher storage capacity in comparison with any other energy storage such as a capacitor or fuel cell, excellent charge/discharge characteristics, and good processability, and thus gets a lot of attention as a next generation energy storage element for a wearable device, electric vehicle and energy storage system, etc.

The lithium secondary battery is composed of an anode, cathode, electrolyte for providing a moving path of a lithium ion between the anode and cathode, and a separator, and generates electrical energy by oxidation-reduction reactions when the lithium ion is inserted into the anode or exerted from the cathode. The lithium secondary battery has a lithium metal having a high energy density as the anode, and a liquid solvent as the electrolyte. Such a lithium secondary battery may have a shorter life expectancy due to a dendrite phenomenon.

SUMMARY

Some embodiments of the present disclosure provide a lithium composite anode in which electric characteristics are improved and a lithium secondary battery using the same.

Some embodiments of the present disclosure also provide a lithium composite anode having improved electrical stability and service life, and a lithium secondary battery using the same.

Some embodiments of the present disclosure also provide a method of fabricating a lithium composite anode in which a fabrication process is simplified.

Issues to be addressed in the present disclosure are not limited to those described above and other issues unmentioned above will be clearly understood by those skilled in the art from the following description.

According to exemplary embodiments of the present inventive concept, a lithium composite anode includes: a metal film; and lithium ion conductors and electron conductors dispersed on one surface of the metal film, wherein some of the lithium ion conductors and the electron conductors are impregnated into the metal film from the one surface of the metal film.

In an embodiment, the lithium ion conductors and the electron conductors may have a one-dimensional linear structure or two-dimensional planar structure.

In an embodiment, the lithium ion conductors and the electron conductors may include nanowires, nanotubes, or nanoplates.

In an embodiment, the lithium ion conductors and the electron conductors may have a core/shell structure in which the electron conductors surround outer surfaces of the lithium ion conductors.

In an embodiment, the lithium composite anode may further include a binder configured to cross-link the lithium ion conductors with the electron conductors between the lithium ion conductors and the electron conductors.

In an embodiment, the lithium ion conductors and the electron conductors may not react with lithium at a driving voltage.

In an embodiment, the lithium ion conductors may include $Li_2O—SiO_2—TiO_2—P_2O_5$ (LSTP), Li4-xGe1-xPx$S_4$ (LGPS), $Li_{3x}La_{2/3-x}TiO_3$ (LLTO), $Li_{1+x}Ti_{2-x}M_x(PO_4)_3$, $Li_3PS_4$- glass-ceramic, $Li_7P_3S_{11}$ glass-ceramic, $Li_4SnS_4$, or polyethylene oxide (PEO) with which a Li salt is mixed, or a mixture thereof, wherein M is aluminum (Al), gallium (Ga), indium (In), or scandium (Sc).

In an embodiment, the electron conductors may include stainless steel (SUS), nickel (Ni), or copper (Cu).

According to exemplary embodiments of the present inventive concept, a lithium secondary battery includes: an anode including a lithium composite anode according to the above-described embodiments; a cathode; and a liquid electrolyte.

According to exemplary embodiments of the present inventive concept, a method of fabricating a lithium composite anode includes: manufacturing a first solution in which lithium ion conductors and electron conductors are mixed; adding a binder to the first solution to manufacture a second solution; coating a current collector with the second solution to form a conductive film; transferring the conductive film onto one surface of a metal film; and impregnating an element of the metal film into the conductive film.

In an embodiment, the impregnating may include a pressing process or thermal process.

In an embodiment, the first solution may further include a solvent, wherein the solvent includes N-Methylpyrrolidone (NMP) or acetone.

In an embodiment, the coating may include a doctor blade operation, a spin coating operation, or a bar coating operation.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept.

DETAILED DESCRIPTION

Figure 1:
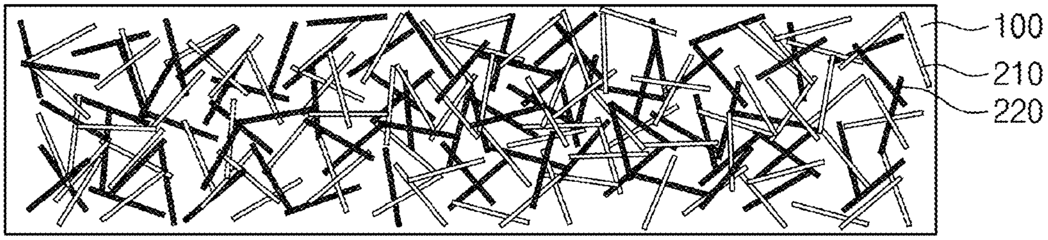
FIGS. 1 and 2 are plan views for describing a lithium composite anode according to embodiments of the present inventive concept.

The embodiments of the present disclosure will now be described with reference to the accompanying drawings for sufficiently understating a configuration and effects of the inventive concept. However, the inventive concept is not limited to the following embodiments and may be embodied in different ways, and various modifications may be made thereto. The embodiments are just given to provide complete disclosure of the inventive concept and to provide thorough understanding of the inventive concept to those skilled in the art. It will be understood to those skilled in the art that the inventive concept may be performed in a certain suitable environment.

The terminology used herein is for the purpose of describing particular embodiments only and is not intended to limit the scope of the present disclosure. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

When a film (or layer) is referred to as being 'on' another film (or layer) or substrate, it can be directly on the other film (or layer) or substrate, or intervening films (or layers) may also be present.

Although the terms first, second, third etc. may be used herein to describe various regions, and films (or layers) etc., the regions and films (or layers) are not to be limited by the terms. The terms may be used herein only to distinguish one region or film (or layer) from another region or film (or layer). Therefore, a layer referred to as a first film in one embodiment can be referred to as a second film in another embodiment. An embodiment described and exemplified herein includes a complementary embodiment thereof. Like reference numerals refer to like elements throughout.

Unless otherwise defined, all terms used herein have the same meaning as commonly understood by one of ordinary skill in the art to which this invention pertains.

Hereinafter, a lithium composite anode according to an embodiment of the inventive concept will be described.

Figure 2:
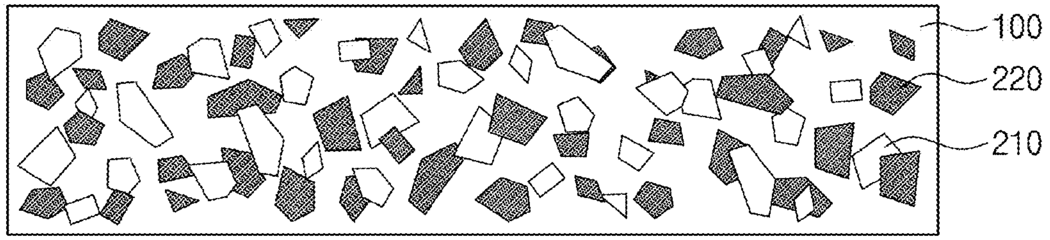
Figure 3:
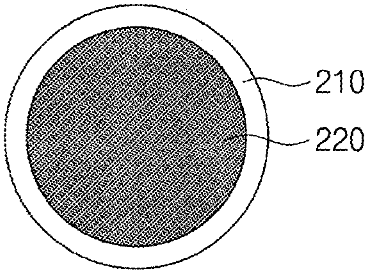
FIG. 3 is a cross-sectional view for describing a structure of lithium ion conductors and electron conductors.

FIGS. 1 and 2 are plan views for describing a lithium composite anode according to embodiments of the present inventive concept. FIG. 3 is a cross-sectional view for describing a structure of lithium ion conductors and electron conductors.

In relation to FIGS. 1 and 2, a lithium composite anode may include a metal film 100, electron conductors 210, and lithium ion conductors 220.

The metal film 100 may be a thick film such as a metal foil. The metal film 100 may be a lithium (Li) thick film.

The electron conductors 210 and the lithium ion conductors 220 may be disposed on one surface of the metal film 100. The electron conductors 210 and the lithium ion conductors 220 may be evenly dispersed on one surface of the metal film 100. The electron conductors 210 and the lithium ion conductors 220 may be embedded in one surface of the metal film 100. In detail, a portion of elements of the electron conductors 210 and the lithium ion conductors 220 may be impregnated toward the inside of the metal film 100 from one surface of the metal film 100. For example, the electron conductors 210 and the lithium ion conductors 220 may be percolated between particles of the metal film 100. The interface shape of the metal film 100 into which the electron conductors 210 and the lithium ion conductors 220 are impregnated will be described in detail with reference to the drawings in relation to Embodiment 2 to be described later. The electron conductors 210 and the lithium ion conductors 220 may be intertwined with each other. The electron conductors 210 and the lithium ion conductors 220 may deliver lithium ions and electrons to each part of the metal film 100.

The electron conductors 210 may have a one-dimensional linear structure (see FIG. 1) or two-dimensional planar structure (see FIG. 2). For example, the electron conductors 210 may be nanowires, nanotubes, or nanoplates. Unlike as shown in the drawing, the electron conductors 210 may have a three-dimensional mass structure. An aspect ratio of the electron conductors 210 may be equal to or greater than 1.1. The length or major axis of the electron conductors 210 may be 1 nm to 500 nm. The mass of the electron conductors 210 may be 20 wt % to 80 wt % with respect to a total mass of the lithium composite anode. The electron conductors 210 may not react with lithium at a driving voltage (e.g. 0 V to 5 V) of the secondary battery. The electron conductors 210 may have high electron conductivity. The electron conductors 210 may include stainless steel (SUS), nickel (Ni) or copper (Cu). Alternatively, the electron conductors 210 may include carbon nanotube (CNT) or graphene.

The lithium ion conductors 220 may have a one-dimensional linear structure (see FIG. 1) or two-dimensional planar structure (see FIG. 2), or instead, have three-dimensional mass structure. For example, the lithium ion conductors 220 may be nanowires, nanotubes, or nanoplates. An aspect ratio of the lithium ion conductors 220 may be equal to or greater than 1.1. The length or major axis of the lithium ion conductors may be 1 nm to 500 nm. The mass of the lithium ion conductors 220 may be 20 wt % to 80 wt % with respect to a total mass of the lithium composite anode. The lithium ion conductors 220 may not react with lithium at a driving voltage (e.g. 0 V to 5 V) of the secondary battery. The lithium ion conductors 220 may have high ion conductivity. The lithium ion conductors 220 may be composed of a polymer conductor including a lithium (Li) salt. For example, the lithium ion conductors 220 may include $Li_2O—SiO_2—TiO_2—P_2O_5$ (LSTP), $Li_4$-xGe$1_{-x}P_xS_4$ (LGPS), $Li_{3x}La_{2/3-x}TiO_3$ (LLTO), $Li_{1+x}Ti_{2-x}M_x$ $(PO_4)_3$, $Li_3PS_{4-}$ glass-ceramic, $Li_7P_3S_{11}$ glass-ceramic, $Li_4SnS_4$, or polyethylene oxide (PEO) with which Li salt is mixed, or a mixture thereof. Here, M may be aluminum (Al), gallium (Ga), indium (In), or scandium (Sc).

Unlike these, the electron conductors 210 and the lithium ion conductors 220 may be junctioned to each other. For example, the lithium ion conductors 220 may be connected to one side of the electron conductors 210. Alternatively, as shown in FIG. 3, the lithium ion conductors 220 and the electron conductors 210 may have a core/shell structure in which the electron conductors 210 surround the outer side of the lithium ion conductors 220.

A binder may be provided between the electron conductors 210 and the lithium ion conductors 220. The mass of the binder may be 1 wt % to 15 wt % with respect to a total mass of the lithium composite anode. The binder may cross-link the electron conductors 210 and the lithium ion conductors 220, and raise adhesion between the metal film 100, and the electron conductors 210 and the lithium ion conductors 220. The binder may include a nonaqueous material or aqueous material. For example, the binder may include polyvinylidene fluoride (PVdF), styrene-butadiene rubber (SBR), carboxymethyl cellulose (CMC), alginate or polyacrylic acid (PAA). The binder may not be provided, if necessary.

Figure 4:
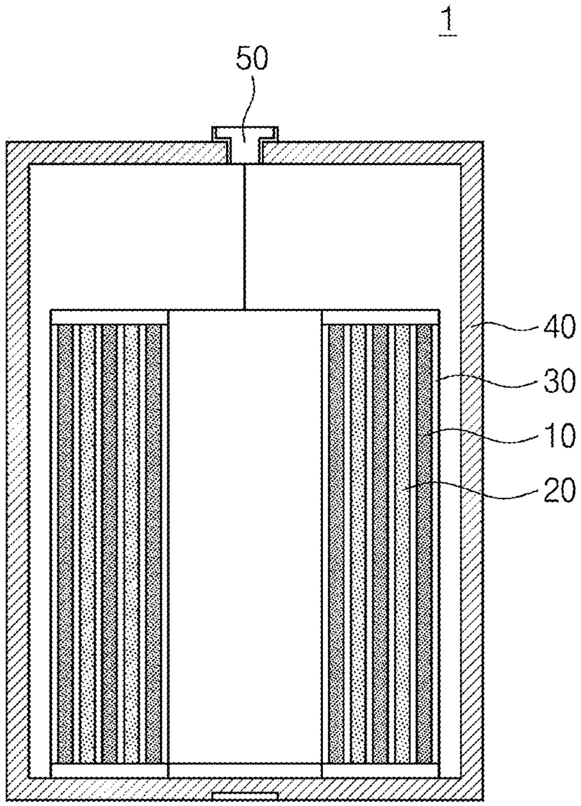
FIG. 4 is a schematic diagram for describing a secondary battery according to embodiments of the present inventive concept.

FIG. 4 is a schematic diagram for describing a secondary battery according to embodiments of the present inventive concept. A secondary battery 1 may be a lithium secondary battery.

In relation to FIG. 4, the secondary battery 1 may include an anode 10, a cathode 20, a separator 30 between the anode 10 and the cathode 20, a liquid electrolyte impregnated into the separator 30, and a battery container 40 and an encapsulation member 50 configured to encapsulate the anode 10, the cathode 20, and the separator 30.

The anode 10 may be the lithium composite anode described in relation to FIGS. 1 and 2. For example, the anode 10 may include a metal film, and lithium ion conductors and electron conductors impregnated into the metal film from one surface of the metal film.

The cathode 20 may be provided. The cathode 20 may include lithium oxide. For example, the cathode 20 may include lithium cobalt oxide (LCO), $LI(NCM)O_2$, or lithium manganese oxide (LMO).

The separator 30 may separate the anode 10 from the cathode 20. As the separator 30, polyethylene, polypropylene, polyvinylidene fluoride (PVDF), or two or more layers of a multilayer film composed therefrom may be used. For example, the separator 30 may be a mixed multilayer film such as a two-layered separator of polyethylene/polypropylene, a three-layered separator of polyethylene/polypropylene/polyethylene, or a three-layered separator of polypropylene/polyethylene/polypropylene.

The liquid electrolyte may include a lithium salt dissolved in an organic solvent. For example, the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$, LiCl, LiI, and a combination thereof. Here, x and y may be natural numbers. The organic solvent may include ethylene carbonate, propylene carbonate, dimethyl carbonate, diethyl carbonate, methylpropyl carbonate, ethylpropyl carbonate, ethylmethyl carbonate, butylene carbonate, or fluorinated vinyl carbonate.

In a lithium composite anode according to embodiments of the inventive concept, lithium ion conductors having high ion conductivity with respect to a lithium ion and electron conductors having high electron conductivity may be impregnated into a metal film. The lithium ions and the electrons may be provided smoothly inside the lithium composite anode, and the electrons or the lithium ions may be evenly provided into the lithium composite anode at the time of driving the secondary battery. Accordingly, the lithium composite anode having high conductivity may be provided, and thus a lithium dendrite may be suppressed from occurring inside the lithium composite anode upon driving the secondary battery. As the lithium dendrite is suppressed from occurring inside the lithium composite anode, the life of the lithium composite anode may be enhanced.

Furthermore, the electron conductors and lithium ion conductors may not react with lithium at an operation voltage (e.g. 0 V or 5 V) of the secondary battery, nor be concerned in driving the secondary battery. In other words, the electron conductors and the lithium ion conductors may not chemically react regardless of conditions in the secondary battery, and thus the electron conductors and the lithium ion conductors may stably perform electric conduction and lithium ion conduction.

In addition, since the electron conductors and the lithium ion conductors have a one-dimensional liner structure or two-dimensional planar structure, the external area thereof may be large and delivery efficiencies of the lithium ions and electrons may be high.

Figure 5:
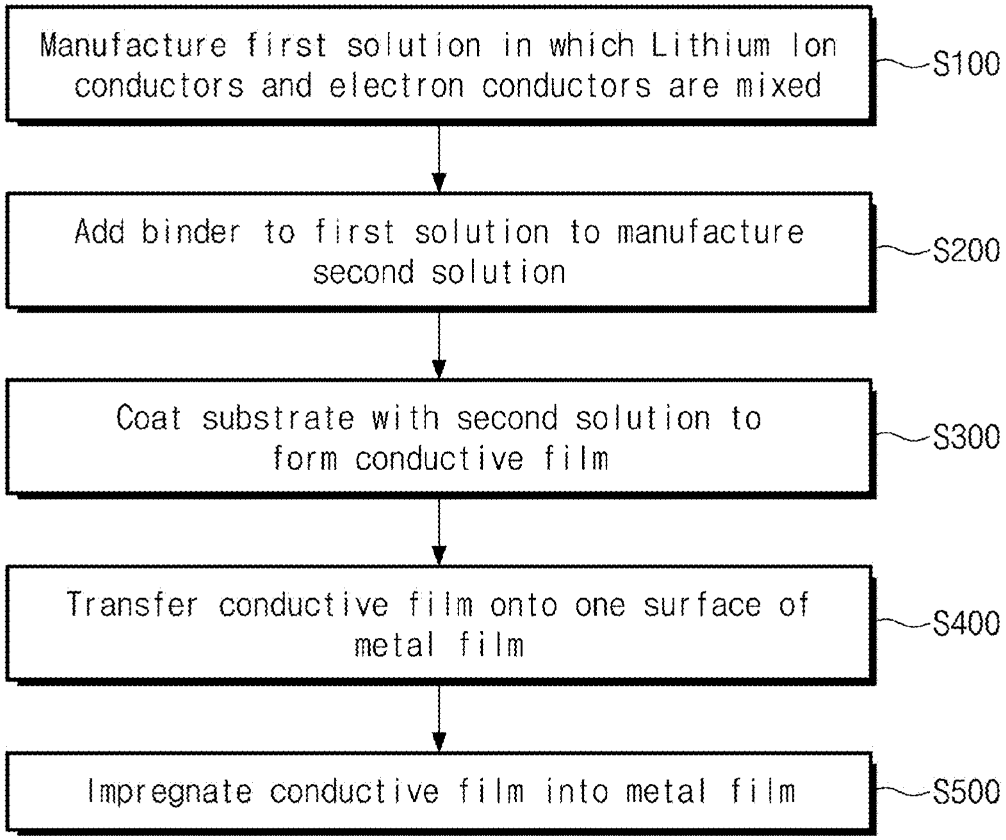
FIG. 5 is a flowchart for describing a method of fabricating a lithium composite anode according to embodiments of the present inventive concept.

FIG. 5 is a flowchart for describing a method of fabricating a lithium composite anode according to embodiments of the present inventive concept. In the present embodiment, repetitive technical features of the lithium composite anode, which have been described with reference to FIGS. 1 to 3, will be omitted, and differences therebetween will be described in detail.

Referring to FIG. 5, a first solution may be manufactured (process S100). For example, the first solution may be fabricated by mixing lithium ion conductors and electron conductors in a solvent. The first solution may be slurry. The lithium ion conductors and electron conductors may be dispersed in the solvent through a mixer. The solvent may include N-Methylpyrrolidone (NMP) or acetone.

A second solution may be manufactured (process S200). For example, a binder may be added to the first solution. The second solution may be slurry. The viscosity of the second solution may be higher than that of the first solution. The binder may be dispersed in the first solution through the mixer.

A conductive film may be formed on the current collector (process S300). For example, the current collector may be coated with the second solution. A coating process with the second solution may include a doctor blade operation, a spin coating operation, or a bat coating operation. The conductive film may have the electron conductors and lithium conductors cross-linked by the binder. The thickness of the conductive film may be 1 μm to 10,000 μm. After the coating process with the second solution, the solvent may be removed. For example, a thermal process may be performed on the conductive film. The thermal process may be performed between at about 70° C. to about 110° C.

Then, the conductive film formed on the current collector may be transferred onto the metal film (process S400). For example, the metal film may be adhered onto one surface of the current collector such that the conductive film is adjacent to the metal film.

The conductive film may be impregnated into the metal film (process S500). For example, the current collector and metal film are pressed, and thus the lithium ion conductors and electron conductors of the conductive film between the current collector and metal film may be permeated into the metal film. The pressing process may be performed through a press process such as roller pressing. At this point, the lithium ion conductors and electron conductors may percolate between the metal particles of the metal film by the pressure, and a portion of metal particles of the metal film may percolate into the conductive film.

Unlike this, the thermal process is performed on the conductive film and metal film, and then the lithium ion conductors and electron conductors of the conductive film may percolate into the metal film. For example, when the melting point of the conductive film is higher than that of the metal film, the metal film is partially dissolved at a temperature between the melting point of the metal film and the melting point of the conductive film to infiltrate between the lithium ion conductors and electron conductors of the conductive film. Alternatively, when the thermal process is performed at a lower temperature than the melting point of the metal film, the metal particles of the metal film may be diffused to the conductive film.

Unlike this, the pressing process and thermal process may be performed together on the conductive film and metal film. At this point, the thermal processing temperature may be lower than the melting points of the metal film and conductive film. According to the fabrication examples having been described so far, the lithium composite anode of FIGS. 1 and 2 may be manufactured.

In a method of fabricating a lithium composite anode according to embodiments of the inventive concept, the lithium composite electrode having improved conductivity and service life may be formed through a simple process such as a mixing process and pressing process.

According to other embodiments, the conductive film may be formed to include elements of the metal film. For example, in the second solution manufacturing process, a metal particle (for example, lithium powder) may be added to the second solution. Then, the current collector may be coated with the second solution to form the conductive film. In this case, the conductive film may be a lithium composite anode. The conductive film may include the electron conductors, lithium ion conductors and metal particles. In other words, a separate process for impregnating the metal particles may not be necessary.

EXPERIMENTAL EXAMPLE

Hereinafter, the inventive concept will be presented in detail through comparison between an experimental example and a comparative example of a lithium composite electrode of embodiments of the inventive concept. However, the scope of the inventive concept is not limited hereto.

Experimental Example 1

A copper (Cu) nanowire has been used as an electron conductor, and $Li_2O—SiO_2—TiO_2—P_2O_5$ (LSTP) has been used as a lithium ion conductor. The electron conductor and lithium ion conductor has been dispersed in an N-Methylpyrrolidone (NMP) solvent. As a binder, polyvinylidene fluoride (PVdF) has been added to the solution to manufacture a second solution. At that point, a mass ratio among Cu nanowire, LSTP and PVdF has been taken as 70:20:10. The second solution has been stirred to be mixed well, and then a conductive film has been formed using the doctor blade operation. The conductive film has been formed to have about 200 μm to 300 μm thickness. Thereafter, a thermal process has been performed on the conductive film to remove the solvent. The thermal process has been performed for 20 minutes under the condition of 100° C. As described above, the conductive film has been formed.

Figure 6:
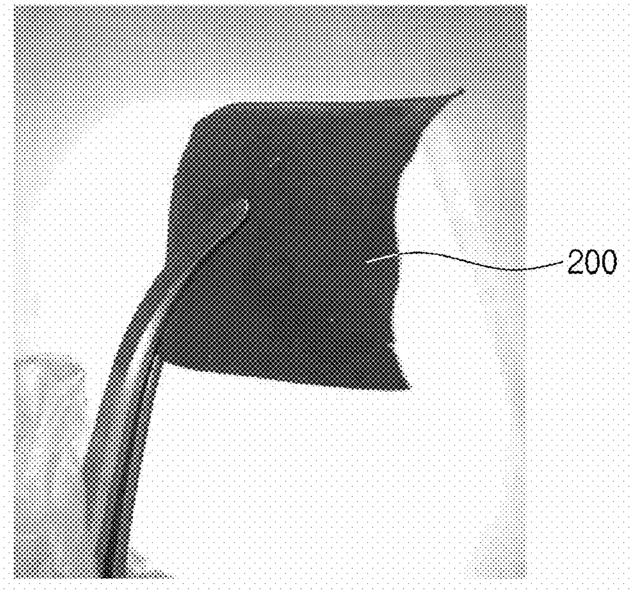
FIG. 6 is a photograph of a conductive film according to Experimental example 1.
Figure 7A:
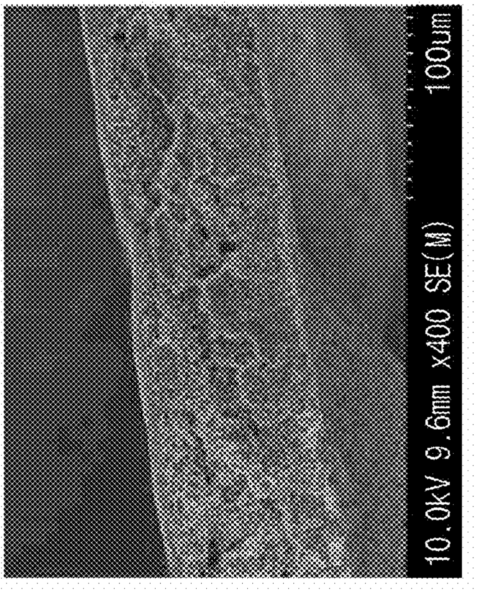
FIGS. 7A to 7C are SEM photographs of the conductive film according to Experimental example 1.
Figure 7B:
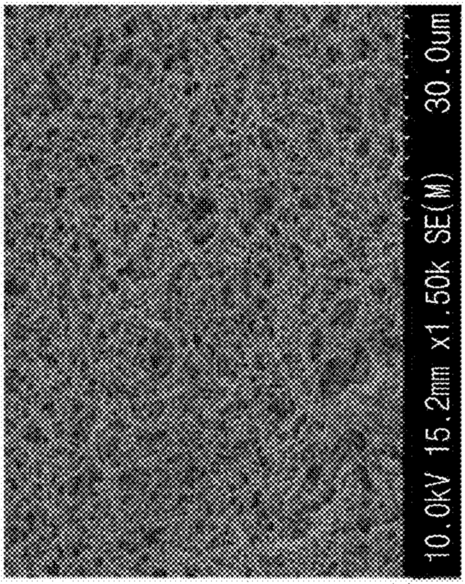
Figure 7C:
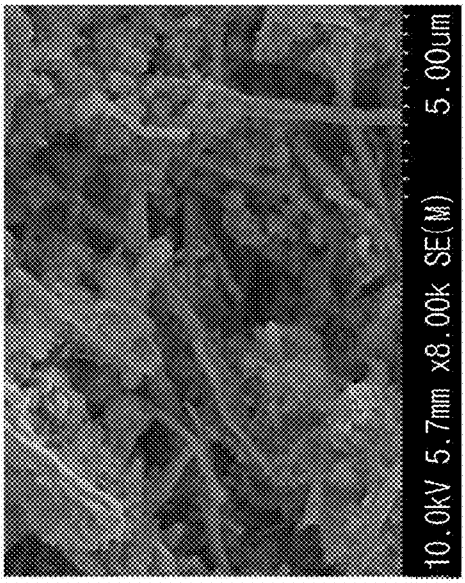
Figure 8:
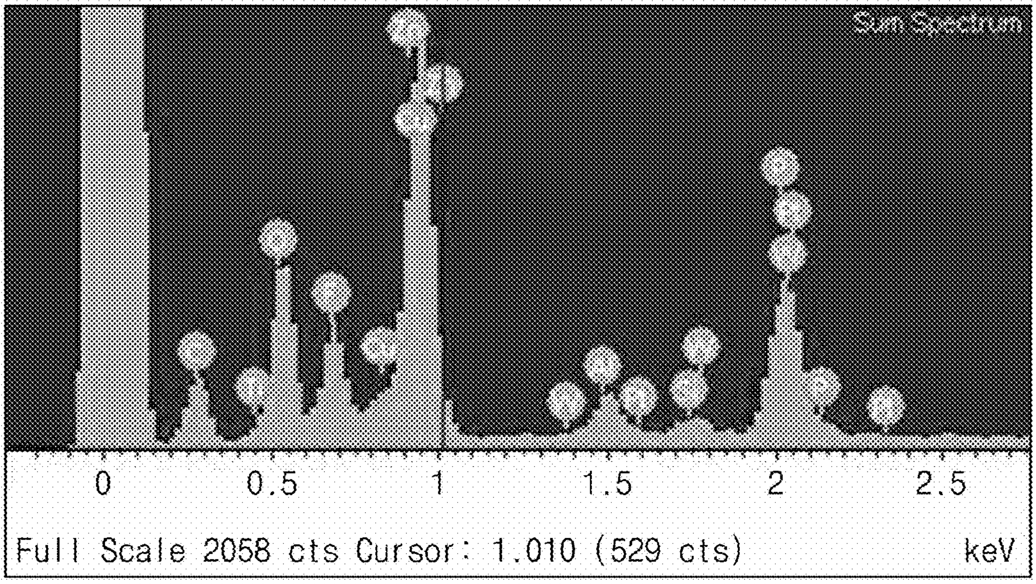
FIG. 8 is an EDS graph of the conductive film according to experimental example 1.

FIG. 6 is a photograph of the conductive film according to experimental example 1, and it may be checked that the foil-type conductive film 200 is formed. FIGS. 7A to 7C are SEM photographs of the conductive film according to Experimental example 1, and electron conductors and lithium ion conductors in a nanowire type may be checked. FIGS. 7A to 7C are photographs respectively magnified 400-fold, 1500-fold and 8000-fold. FIG. 8 is an energy dispersive spectroscopy (EDS) graph of the conductive film according to Experimental example 1, and it may be checked that copper and lithium oxides are mixed.

Experimental Example 2

A second solution has been manufactured with the electron conductors, lithium ion conductors and binders identical to those of Experimental 1, but the mass ratio of the copper nanowire, LSTP and PVdF has been 56:40:4. The current collector has been coated with the second solution by the doctor blade operation to form a conductive film. As the current collector, a copper foil has been used. The conductive film has been formed to have about 200 μm to 300 μm thickness. As described above, the conductive film has been formed.

Figure 9:
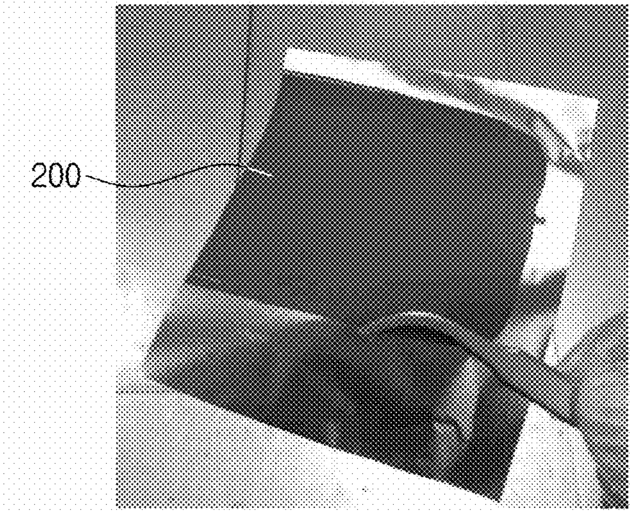
FIG. 9 is a photograph of a current collector and conductive film according to Experimental example 2.
Figure 10:
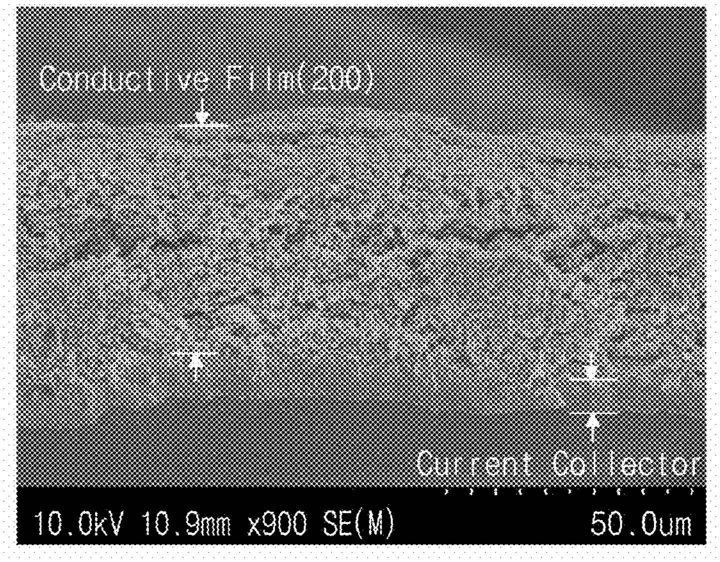
FIG. 10 is an SEM photograph of the current collector and conductive film according to Experimental example 2.
Figure 11:
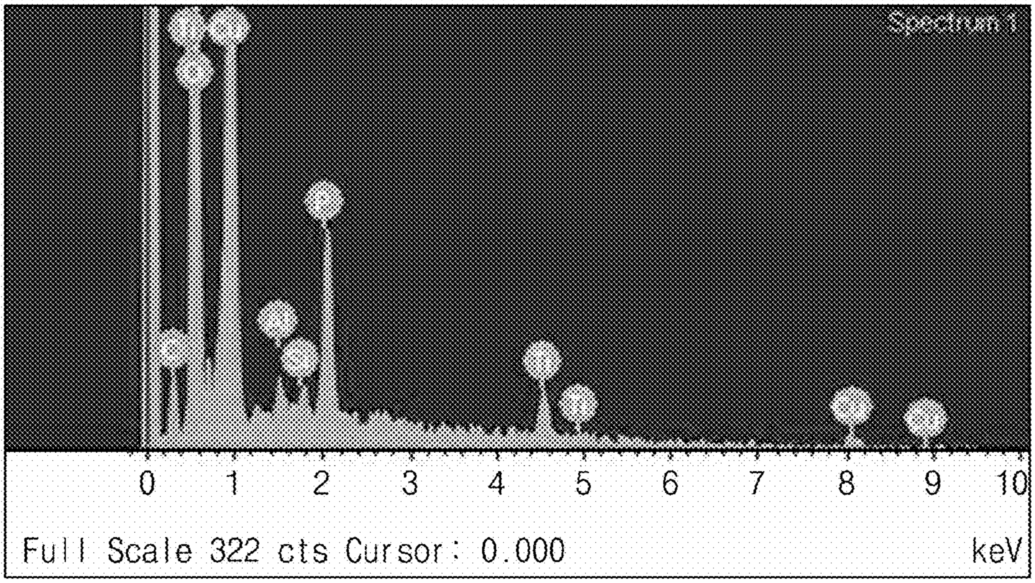
FIG. 11 is an EDS graph of the current collector and conductive film according to Experimental example 2.

FIG. 9 is a photograph of the current collector and conductive film according to Experimental example 2, and it may be checked that the conductive film 200 is formed on the foil-type current collector. FIG. 10 is an SEM photograph of the current collector and conductive film according to Experimental example 2. FIG. 11 is an EDS graph of the current collector and conductive film according to Experimental example 2, and it may be checked that copper and lithium oxides are mixed.

After the metal film being disposed on the current collector on which the conductive film 200 has been formed, a roll pressing process and thermal process has been performed on the metal film and current collector such that the ion conductors and electron conductors are impregnated into the metal film. The thermal process has been performed under the condition of 100° C. As described above, the conductive film has been formed.

Figure 12D:
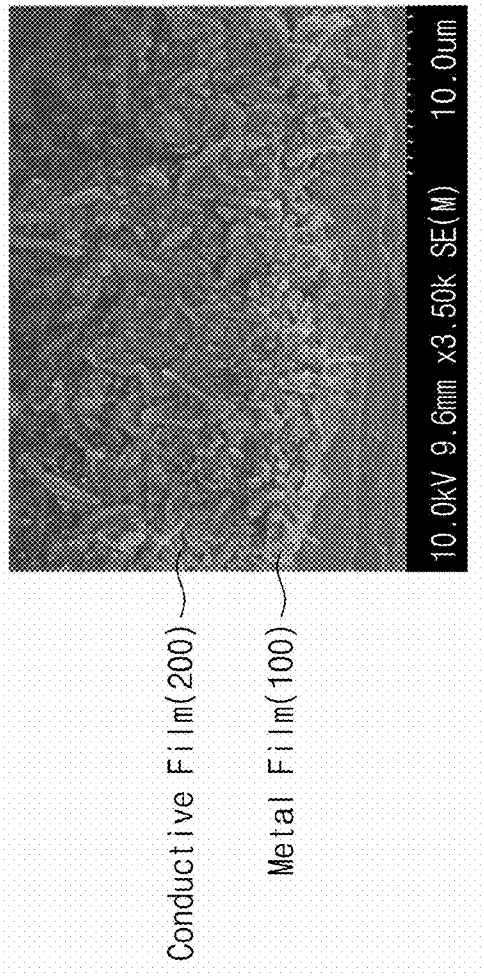
FIGS. 12D and 12E are SEM photographs of a lithium composite anode according to Experimental example 2.
Figure 12E:
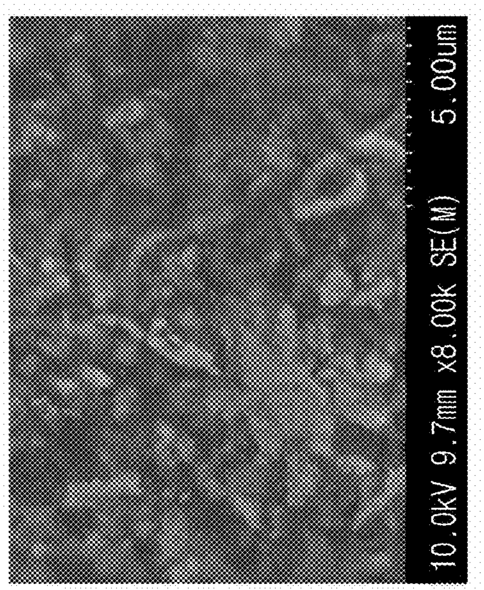

FIGS. 12D and 12E are SEM photographs of the lithium composite anode according to Experimental example 2. FIGS. 12D and 12E are photographs respectively magnified 3,500-fold and 8,000-fold. In FIG. 12, it may be checked that the ion conductors and electron conductors are permeated into the metal film 100 from one surface of the metal film 100 and thus the boundary between the metal film 100 and conductor film 200 is not obvious. In other words, it may be checked that the conductive film 200 is impregnated into the metal film 100.

Then, a secondary battery has been fabricated using the lithium composite battery. As the cathode, lithium cobalt oxide (LCO) has been used, and as the electrolyte, an electrolyte in which $LiPF_6$ has been dissolved in EC/DMC has been used. $LiPF_6$ has been dissolved in EC/DMC at a concentration of 1M. As described above, the conductive film has been formed.

Comparative Example

A lithium foil having the similar thickness to that of the lithium composite anode of Experimental example 2 has been used. Besides, a secondary battery has been formed by making the cathode and electrolyte identical to those of Experimental example 2.

Figure 13:
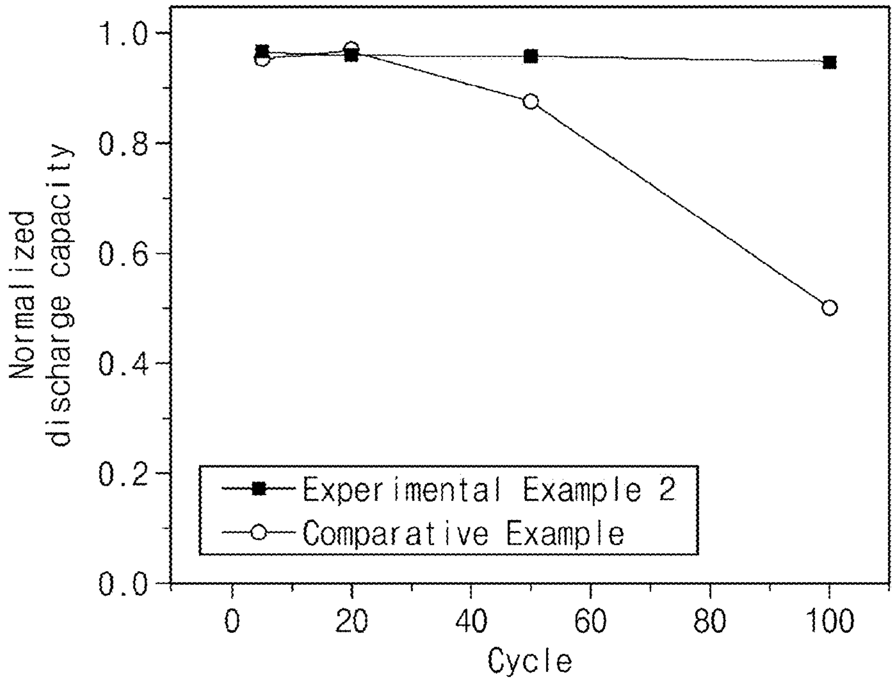
FIG. 13 is a graph showing that discharge capacities of Experimental example 2 and Comparative example are comparatively measured.

FIG. 13 is a graph showing that discharge capacities of Experimental example 2 and Comparative example are comparatively measured.

In relation to FIG. 3, the secondary battery of Experimental example 2 and that of Comparative example has been repetitively charged and discharged, and discharge capacities thereof has been measured. As shown in FIG. 12, it may be checked that according to repetition of the charging and discharging, the discharge capacity of the secondary battery has not be reduced in Experimental example 2, while the discharge capacity of the secondary battery has been reduced in Comparative example.

In other words, it may be checked that the service lives of a lithium composite anode according to embodiments of the inventive concept and a secondary battery using the same are enhanced.

In a lithium composite anode according to embodiments of the inventive concept, electrons or lithium ions may be evenly provided into the lithium composite anode at the time of driving a secondary battery. A lithium composite anode having high conductivity may be provided, and thus a lithium dendrite may be suppressed from occurring inside the lithium composite anode upon driving a secondary battery. Accordingly, the life of the lithium composite anode may be improved.

Furthermore, electron conductors and lithium ion conductors may not chemically react regardless of conditions in a secondary battery, and thus the electron conductors and lithium ion conductors may stably perform electric conduction and lithium ion conduction.

In a fabrication method of lithium composite anode according to embodiments of the inventive concept, a lithium composite electrode having improved conductivity and service life may be formed through a simple process such as a mixing process and pressing process.

Although the exemplary embodiments of the inventive concept have been described, it is understood that the inventive concept may be implemented as other concrete forms without changing the inventive concept or essential features. Therefore, these embodiments as described above are only proposed for illustrative purposes and do not limit the present disclosure.

The exemplary embodiments of the present disclosure have been described above with reference to the accompanying drawings, but those skilled in the art will understand that the present disclosure may be implemented in another concrete form without changing the technical spirit or an essential feature thereof. Therefore, the aforementioned exemplary embodiments are all illustrative and are not restricted to a limited form.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A lithium composite anode for lithium battery, comprising:

a metal film having a first portion and a second portion, the first portion including a first surface, the second portion including a second surface that is opposite to the first surface; and a conductive film including lithium metal particles, lithium ion conductors, electron conductors, and a binder, wherein the lithium ion conductors and the electron conductors are cross-linked by the binder and disposed over the first surface of the metal film;

a combination of the first portion of the metal film and lithium ion conductors and electron conductors dispersed in the first portion of the metal film, the combination disposed between the conductive film and the metal film, each of the lithium ion conductors and the electron conductors having a solid structure; and a collector on the second surface of the metal film, wherein the metal film includes a lithium, wherein some of the lithium ion conductors and the electron conductors are impregnated into the first portion of the metal film from the first surface of the metal film, wherein none of the lithium ion conductors and the electron conductors are impregnated into the second portion of the metal film from the first surface of the metal film, wherein a melting point of the conductive film is higher than that of the metal film, wherein the lithium ion conductors have a one-dimensional linear structure, a two-dimensional planar structure, or a three-dimensional mass structure, wherein the electron conductors have a one-dimensional linear structure, a two-dimensional planar structure, or a three-dimensional mass structure.

2. The lithium composite anode of claim 1, wherein the lithium ion conductors and the electron conductors comprise nanowires, nanotubes, or nanoplates.

3. The lithium composite anode of claim 1, wherein the lithium ion conductors and the electron conductors do not react with lithium at a driving voltage.

4. The lithium composite anode of claim 1, wherein the lithium ion conductors comprise $Li_2O—SiO_2—TiO_2—P_2O_5$ (LSTP), $Li_3PS_4$- glass-ceramic, $Li_7P_3S_{11}$ glass-ceramic, $Li_4SnS_4$.

5. The lithium composite anode of claim 1, wherein the electron conductors comprise stainless steel (SUS), nickel (Ni), or copper (Cu).

6. The lithium composite anode of claim 1, wherein each of the lithium ion conductors has an aspect ratio that is equal to or greater than 1.1.

7. The lithium composite anode of claim 1, wherein a length of each of the lithium ion conductors is in a range from 1 nm to 500 nm.

8. The lithium composite anode of claim 1, wherein mass of the lithium ion conductors is in a range from 20 wt % to 80 wt % with respect to total mass of the lithium composite anode.

9. The lithium composite anode of claim 1, wherein the combination comprises a binder.

10. A lithium secondary battery comprising:

a first electrode;

a second electrode; and an electrolyte between the first electrode and the second electrode, wherein the first electrode includes:

a metal film having a first portion and a second portion, the first portion including a first surface, the second portion including a second surface that is opposite to the first surface;

a conductive film including lithium metal particles, lithium ion conductors, electron conductors, and a binder, wherein the lithium ion conductors and the electron conductors are cross-linked by the binder and disposed over the first surface of the metal film;

a combination of the first portion of the metal film and lithium ion conductors and electron conductors dispersed in the first portion of the metal film, the combination disposed between the conductive film and the metal film, each of the lithium ion conductors and the electron conductors having a solid structure; and a collector on the second surface of the metal film, wherein the metal film includes lithium, wherein some of the lithium ion conductors and the electron conductors are impregnated into the first portion of the metal film from the first surface of the metal film, wherein none of the lithium ion conductors and the electron conductors are impregnated into the second portion of the metal film from the first surface of the metal film, wherein a melting point of the conductive film is higher than that of the metal film, wherein the lithium ion conductors have a one-dimensional linear structure, two-dimensional planar structure, or three-dimensional mass structure, wherein the electron conductors have a one-dimensional linear structure, a two-dimensional planar structure, or a three-dimensional mass structure.

11. The lithium secondary battery of claim 10, wherein the electron conductors comprise stainless steel (SUS), nickel (Ni), or copper (Cu).

12. The lithium secondary battery of claim 10, wherein the combination comprises a binder.

* * * * *